US009888206B2

United States Patent
Nakagawa (10) Patent No.: US 9,888,206 B2
(45) Date of Patent: Feb. 6, 2018

(54) IMAGE CAPTURING CONTROL APPARATUS THAT ENABLES EASY RECOGNITION OF CHANGES IN THE LENGTH OF SHOOTING TIME AND THE LENGTH OF PLAYBACK TIME FOR RESPECTIVE SETTINGS, CONTROL METHOD OF THE SAME, AND STORAGE MEDIUM

(71) Applicant: CANON KABUSHIKI KAISHA, Tokyo (JP)

(72) Inventor: Koichi Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/965,167

(22) Filed: Dec. 10, 2015

(65) Prior Publication Data

US 2016/0173810 A1    Jun. 16, 2016

(30) Foreign Application Priority Data

Dec. 16, 2014  (JP) ................. 2014-254551

(51) Int. Cl.
| | |
|---|---|
| H04N 5/77 | (2006.01) |
| G11B 27/00 | (2006.01) |
| H04N 5/783 | (2006.01) |
| H04N 5/232 | (2006.01) |

(52) U.S. Cl.
CPC .......... H04N 5/772 (2013.01); G11B 27/005 (2013.01); H04N 5/23216 (2013.01); H04N 5/783 (2013.01)

(58) Field of Classification Search
CPC ...... H04N 5/783; H04N 5/772; H04N 5/2621; H04N 5/262; G11B 27/005
USPC ....................................................... 386/239
See application file for complete search history.

(56) References Cited

U.S. PATENT DOCUMENTS

| | | | |
|---|---|---|---|
| 8,810,689 B2* | 8/2014 | Ozawa ................. | H04N 5/772 348/231.3 |
| 9,338,421 B2* | 5/2016 | Mizuno ................. | H04N 5/232 |
| 2004/0017481 A1* | 1/2004 | Takasumi ............. | H04N 5/2353 348/207.99 |
| 2010/0226622 A1* | 9/2010 | Morikawa ............. | H04N 5/783 386/248 |

(Continued)

FOREIGN PATENT DOCUMENTS

JP    2010-212875 A    9/2010

*Primary Examiner* — David Harvey
(74) *Attorney, Agent, or Firm* — Cowan, Liebowitz & Latman, P.C.

(57) ABSTRACT

There is provided an image capturing control apparatus. A selection unit selects, as a setting relating to shooting of a moving image, any of a plurality of settings having respectively different ratios of a shooting time to a playback time. A display control unit performs control: such that a predetermined shooting time and a playback time that corresponds to the predetermined shooting time and is different for each setting are displayed for a setting in which a shooting time is shorter than a playback time, out of the plurality of settings; and such that a predetermined playback time and a shooting time that corresponds to the predetermined playback time and is different for each setting are displayed for a setting in which a shooting time is longer than a playback time, out of the plurality of settings.

17 Claims, 9 Drawing Sheets

(56) References Cited

U.S. PATENT DOCUMENTS

| | | | |
|---|---|---|---|
| 2010/0260472 A1* | 10/2010 | Okada | H04N 5/772 |
| | | | 386/343 |
| 2012/0069204 A1* | 3/2012 | Shimizu | H04N 5/23277 |
| | | | 348/208.4 |
| 2014/0186006 A1* | 7/2014 | Jin | H04N 5/783 |
| | | | 386/230 |
| 2016/0173810 A1* | 6/2016 | Nakagawa | H04N 5/772 |
| | | | 386/225 |
| 2016/0269674 A1* | 9/2016 | Rathore | H04N 5/2621 |

* cited by examiner

| | 🎥 | ▶ |
|---|---|---|
| x1/4 | 1 MIN | 4 MINS |
| x1/2 | 1 MIN | 2 MINS |
| OFF | 1 MIN | 1 MIN |
| x2 | 2 MINS | 1 MIN |
| x4 | 4 MINS | 1 MIN |
| x10 | 10 MINS | 1 MIN |

SET SHOOTING SPEED MULTIPLICATION FACTOR

IMAGE CAPTURING CONTROL APPARATUS THAT ENABLES EASY RECOGNITION OF CHANGES IN THE LENGTH OF SHOOTING TIME AND THE LENGTH OF PLAYBACK TIME FOR RESPECTIVE SETTINGS, CONTROL METHOD OF THE SAME, AND STORAGE MEDIUM

BACKGROUND OF THE INVENTION

Field of the Invention

The present invention relates to an image capturing control apparatus, a method of controlling the same, and a storage medium.

Description of the Related Art

There are conventional video cameras with which it is possible to set the shooting speed so as to be different from that during normal recording, and it is possible to perform slow recording and fast recording (see Japanese Patent Laid-Open No. 2010-212875). Slow recording is a method of recording a slow moving image that plays back slower than real time during playback, by shooting at a shooting frame rate that is set to be faster than the normal frame rate. Fast recording is a method of recording a fast moving image that plays back faster than real time during playback, by carrying out intermittent recording in which frames of a moving image shot at a normal shooting frame rate are thinned out and recorded. Fast recording is also called time lapse shooting, low-speed shooting, slow motion shooting, interval shooting, and the like.

In the case in which slow recording or fast recording is performed, the actual shooting time and the playback time of the moving image do not coincide. For this reason, when the user shoots a moving image without recognizing the difference between the actual shooting time and the playback time, there is a possibility that an extremely long or short moving image will be unintentionally generated. To give an example, in the case in which fast recording is performed at a speed of 1200 times faster than the normal shooting speed, the playback time will be $1/1200$ of the actual shooting time, and a moving image shot for one hour will have a playback time of only three seconds.

SUMMARY OF THE INVENTION

The present invention was made in view of such circumstances and provides technology that allows the user to more easily recognize the difference between the actual shooting time and the playback time of a moving image generated by slow recording or fast recording.

According to a first aspect of the present invention, there is provided an image capturing control apparatus, comprising: a selection unit configured to select, as a setting relating to shooting of a moving image by an image capturing unit, any of a plurality of settings having respectively different ratios of a shooting time to a playback time; and a display control unit configured to perform control: such that a predetermined shooting time and a playback time that corresponds to the predetermined shooting time and is different for each setting are displayed for a setting in which a shooting time is shorter than a playback time, out of the plurality of settings; and such that a predetermined playback time and a shooting time that corresponds to the predetermined playback time and is different for each setting are displayed for a setting in which a shooting time is longer than a playback time, out of the plurality of settings.

According to a second aspect of the present invention, there is provided a method of controlling an image capturing control apparatus, comprising: selecting, as a setting relating to shooting of a moving image by an image capturing unit, any of a plurality of settings having respectively different ratios of a shooting time to a playback time; and performing control such that a predetermined shooting time and a playback time that corresponds to the predetermined shooting time and is different for each setting are displayed for a setting in which a shooting time is shorter than a playback time, out of the plurality of settings, and such that a predetermined playback time and a shooting time that corresponds to the predetermined playback time and is different for each setting are displayed for a setting in which a shooting time is longer than a playback time, out of the plurality of settings.

According to a third aspect of the present invention, there is provided a non-transitory computer-readable storage medium which stores a program for causing a computer to execute a method of controlling an image capturing control apparatus, the method comprising: selecting, as a setting relating to shooting of a moving image by an image capturing unit, any of a plurality of settings having respectively different ratios of a shooting time to a playback time; and performing control: such that a predetermined shooting time and a playback time that corresponds to the predetermined shooting time and is different for each setting are displayed for a setting in which a shooting time is shorter than a playback time, out of the plurality of settings; and such that a predetermined playback time and a shooting time that corresponds to the predetermined playback time and is different for each setting are displayed for a setting in which a shooting time is longer than a playback time, out of the plurality of settings.

Further features of the present invention will become apparent from the following description of exemplary embodiments with reference to the attached drawings.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

Figure 1:
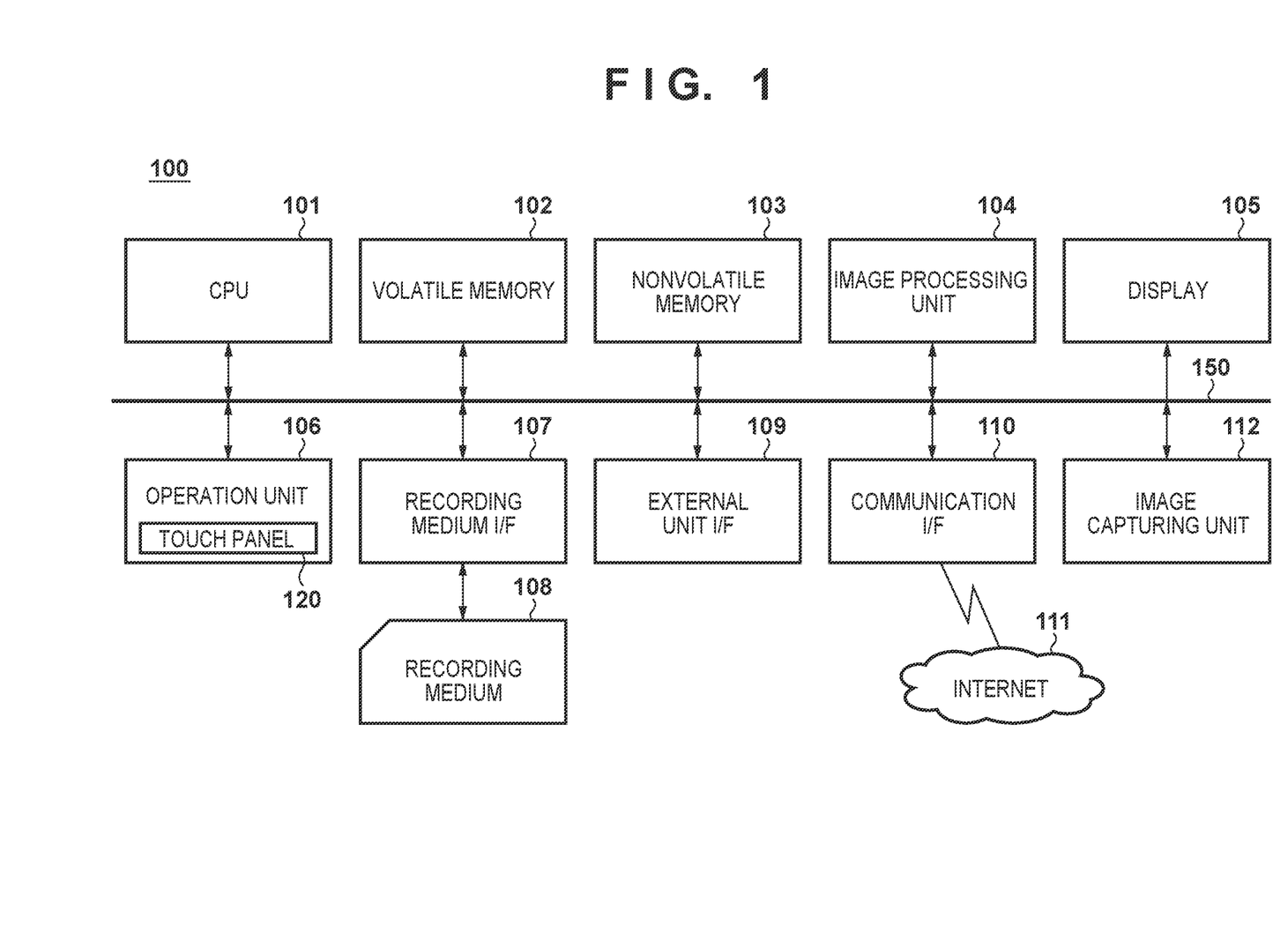
FIG. 1 is a block diagram showing a configuration of an image capturing apparatus 100 that is an example of an image capturing control apparatus to which the present invention is applicable.

FIG. 1 is a block diagram showing a configuration of an image capturing apparatus 100 that is an example of an image capturing control apparatus to which the present invention is applicable. A CPU 101, a volatile memory 102, a nonvolatile memory 103, an image processing unit 104, a display 105, an operation unit 106, a recording medium I/F 107, an external unit I/F 109, a communication I/F 110, and an image capturing unit 112 are connected to an internal has 150 of the image capturing apparatus 100. The units connected to the internal bus 150 are configured such that data can be exchanged between them via the internal bus 150.

The CPU 101 controls the units of the image capturing apparatus 100 using the volatile memory 102 as a work memory, in accordance with various types of programs stored in the nonvolatile memory 103, for example. The volatile memory 102 is constituted by a RAM (a volatile memory that uses a semiconductor element, etc.), for example. The nonvolatile memory 103 is, for example, constituted by a hard disk (HD), a ROM or the like. The nonvolatile memory 103 stores various types of data such as image data and audio data in addition to storing the various types of programs mentioned above.

The image processing unit 104 performs various types of image processing on image data based on control by the CPU 101. Image data that is to be processed includes image data stored in the nonvolatile memory 103 or the recording medium 108, video signals obtained via the external unit I/F 109, image data obtained via the communication I/F 110, and image data captured by the image capturing unit 112. Image processing performed by the image processing unit 104 includes A/D conversion processing, D/A conversion processing, image data encoding processing, compression processing, decoding processing, enlargement/reduction processing (resizing), noise reduction processing, and color conversion processing. The image processing unit 104 may be configured as a dedicated circuit block for performing specific image processing. Also, depending on the type of image processing, the CPU 101 can perform image processing in accordance with a program, without using the image processing unit 104.

The display 105 displays images, GUI (Graphical User Interface) screens that constitutes GUIs, and the like based on control by the CPU 101. The CPU 101 generates a display control signal in accordance with the programs, and controls the units of the image capturing apparatus 100 to generate a video signal for the displaying on the display 105 and output the video signal to the display 105. The display 105 displays video based on the output video signal.

The operation unit 106 is an input, device for accepting user operations, and includes a text information input device such as a keyboard, a pointing device such as a mouse or a touch panel 120, buttons, a dial, a joystick, a touch sensor, and a touch pad. Note that the touch panel 120 is configured to be flat and to overlay the display 105, and is an input device configured such that coordinate information corresponding to a location that was touched is output.

The recording medium I/F 107 is configured such that the recording medium 108, which is a memory card, a CD, or a DVD, can be attached, and reads out data from the attached recording medium 108 and writes data to the recording medium 108 based on control by the CPU 101.

The external unit I/F 109 is an interface for inputting and outputting video signals and audio signals, and is connected to an external device wirelessly or by a cable. The communication I/F 110 is an interface for transmitting and receiving various types of data such as files and commands by communicating (including telephone communication) with an external device, an internet 111 or the like.

The image capturing unit 112 is a camera unit constituted by an image sensor such as a CCD sensor or a CMOS sensor, a zoom lens, a focus lens, a shutter, an aperture, a distance measurement unit, an A/D converter, and the like. It is possible to capture still images and moving images with the image capturing unit 112. Image data of a captured image is transmitted to the image processing unit 104 and recorded in the recording medium 108 as a still image file or a moving image file after undergoing various types of processing.

The CPU 101 detects the following operations and states relating to the touch panel 120:
The touch panel 120 having been touched with a finger or a pen (hereinafter "touchdown").
The state in which the touch panel 120 is being touched with a finger or a pen (hereinafter "touch on").
A finger or pen moving while touching the touch panel 120 (hereinafter "move")
Removal of the pen or the finger that was touching the touch panel 120 (hereinafter "touch up").
The state in which nothing is touching the touch panel 120 (hereinafter "touch off").

These operations and states and the location coordinates of where the finger or pen is touching the touch panel 120 are notified to the CPU 101 via the internal bus 150. The CPU 101 determines what type of operation was performed on the touch panel 120 based on the notified information, in the case of "move", the CPU 101 can also determine the movement direction of the finger or the pen moving on the touch panel 120 for each vertical component and each horizontal component on the touch panel 120 based on the change in the location coordinates. Also, it is determined that a stroke has been drawn when a "touch up" is performed after a given "move" from a "touch down" on the touch panel 120. An operation in which a stroke is drawn quickly is called a "flick". A "flick" is an operation in which a finger moves quickly for a certain distance while touching the touch panel 120 and is then directly removed; in other words, a "flick" is a fast tracing operation in which the touch panel 120 is flicked with a finger. When a "move" at or above a predetermined speed is detected for greater than or equal to a predetermined distance and then a "touch up" is detected, it can be determined that a "flick" has been performed. Also, in the case in which a "move" at less than the predetermined speed is detected for greater than or equal to the predetermined distance, it is determined that a drag has been performed. The touch panel 120 may use any of a variety of systems for touch panels including a resistive film system, a capacitive system, a surface acoustic wave system, an infrared system, an electromagnetic induction system, an image recognition system, and an optical sensor system.

In the present embodiment, the image capturing apparatus 100 has a record start button and a record stop button on the operation unit 106. Pressing the record start button starts recording of a moving image and pressing the record stop button stops recording of the moving image.

Also, in the present embodiment, the image capturing apparatus 100 can change the shooting speed multiplication factor for the moving image (the ratio of the actual shooting time to the playback time). In the case in which the multiplication factor is set to be smaller than one, it is possible to record a slow moving image that plays back longer than the actual shooting time during playback. In the case in which the multiplication factor is set to be greater than one, it is possible to record a fast moving image that plays back shorter than the actual shooting time during playback.

Also, in the present embodiment, the image capturing apparatus 100 has a record mode called a snap record mode. In the case in which this record mode is set, the image capturing apparatus 100 automatically stops recording upon a predetermined time period (hereinafter "snap recording time"; e.g. four seconds) having elapsed after the record start button was pressed, even if the record stop button has not been pressed. The operation unit 106 includes a snap button, and the snap record mode is activated by the user pressing the snap button. Also, the snap record mode is deactivated by the user pressing the snap button again in the state in which the snap record mode is activated. In this way, the user can set the snap record mode (a predetermined operation mode) to be activated or deactivated by using the snap button.

In the present embodiment, the image capturing apparatus 100 has, as a screen for display on the display 105, a normal screen on which the remaining recording capacity of the recording medium, the current setting status of various functions, and the like are displayed. Also, the image capturing apparatus 100 has a multiplication factor selection screen that is for the user to select between performing normal recording, slow recording, or fast recording, and for selecting the multiplication factor for slow recording or fast recording.

Figure 2:
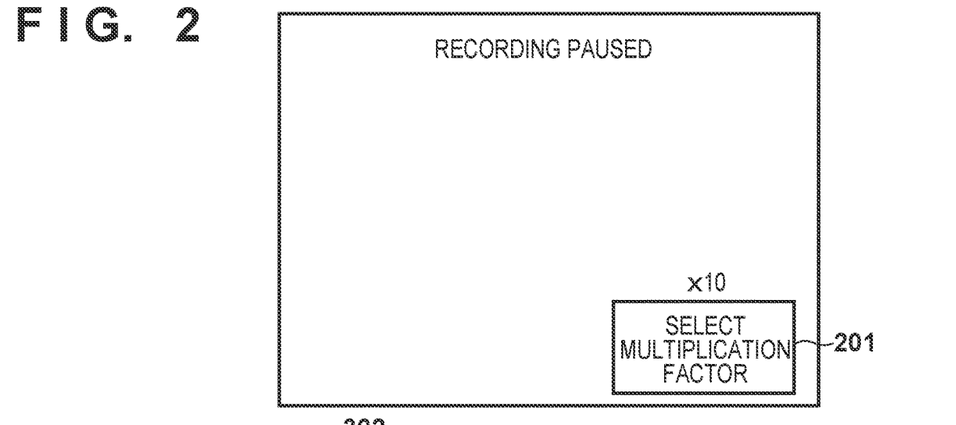
FIG. 2 is a diagram showing an example of a normal screen displayed on a display 105 of the image capturing apparatus 100.

FIG. 2 is a diagram showing an example of the normal screen display. On the normal screen, a multiplication factor selection screen display button 201 is displayed on the display 105, and the screen of the display 105 transitions to the multiplication factor selection screen due to the user pressing the multiplication factor selection screen display button 201.

Figure 3A:
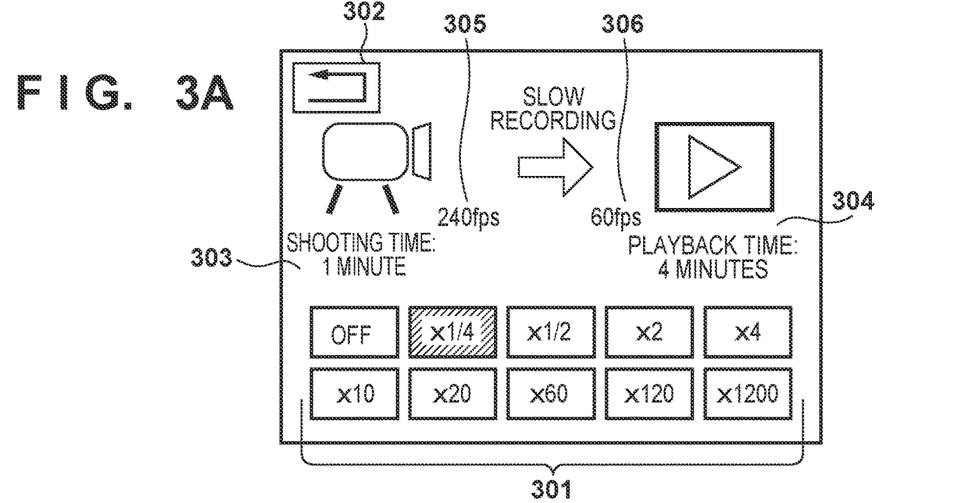
FIGS. 3A to 3B are diagrams showing an example of a multiplication factor selection screen displayed on the display 105 of the image capturing apparatus 100 (in a case of slow recording).

FIGS. 3A to 5 are diagrams showing an example of the multiplication factor selection screen display. As shown in FIG. 3A, a plurality of multiplication factor buttons 301 for selecting a shooting speed multiplication factor and a close settings button 302 for closing the multiplication factor selection screen are displayed on the multiplication factor selection screen. The shooting speed multiplication factor is determined by the user pressing the close settings button 302 after pressing one of the multiplication factor buttons 301 to select the shooting speed multiplication factor. When the shooting speed multiplication factor is selected, the image capturing apparatus 100 displays an example of the shooting time (hereinafter, "shooting time example") and an example of the playback time (hereinafter, "playback time example") so that the user can easily recognize the relationship between the actual shooting time and the playback time for the moving image. In the example in FIG. 3A, slow recording of ¼× has been selected, and a shooting time example 303
shows "one minute" and a playback time example 304 shows "four minutes". Also, the multiplication factor selection screen includes an image capturing unit frame rate display 305 and an image processing unit frame rate display 306. The image capturing unit frame rate display 305 indicates how many frames the image capturing unit 112 processes per second during shooting. The image processing unit frame rate display 306 indicates how many frames the image processing unit 104 processes per second during shooting. If the user is an advanced user that uses a professional video camera, the user can more accurately understand what type of moving image will be shot with the current settings by looking at the respective frame rate displays.

Next, operations of the image capturing apparatus 100 will be described with reference to FIG. 6. The flowchart in FIG. 6 relates to operations of the image capturing apparatus 100 when the user sets the shooting speed multiplication factor and then starts and stops recording of a moving image. Unless otherwise stated, the processing for the steps of this flowchart is realized by the CPU 101 expanding programs recorded to the nonvolatile memory 103 in the volatile memory 102 functioning as the work memory and executing the expanded programs. When the user sets the operation mode of the image capturing apparatus 100 to a record mode using the operation unit 106, the CPU 101 displays the normal screen (FIG. 2) on the display 105 and starts the processing for this flowchart.

First, in step S601, the CPU 101 determines whether or not the multiplication factor selection screen display button 201 (FIG. 2) displayed on the display 105 has been pressed by the user. If the multiplication factor selection screen display button 201 has been pressed, the procedure moves to step S602, otherwise the procedure moves to step S604.

In step S602, the CPU 101 displays the multiplication factor selection screen on the display 105 and operates such that user selection and determination of the shooting speed multiplication factor is accepted. Details of the multiplication factor selection processing in step S602 are described below with reference to FIG. 7.

In step S603, the CPU 101 performs various types of setting processing required to shoot a moving image at the shooting speed multiplication factor determined in step S602. Details of the recording setting processing in step S603 are described below with reference to FIG. 9.

In step S604, the CPU 101 determines whether or not the record start button on the operation unit 106 has been pressed. If the record start button has been pressed, the procedure moves to step S605, otherwise the procedure returns to step S601.

In step S605, the CPU 101 starts recording of the moving image. Specifically, the CPU 101 controls the image capturing unit 112, the image processing unit 104, and the like based on the settings configured in step S603. Accordingly, the video signal captured by the image capturing unit 112 is encoded by the image processing unit 104 and recorded as an encoded moving image file to the recording medium 108 via the recording medium I/F 107. Note that the CPU 101 controls the recording of the moving image based on the default settings, if the procedure moves to step S605 without the recording setting processing having been performed in step S603.

In step S606, the CPU 101 determines whether or not the record stop button on the operation unit 106 has been pressed. If the record stop button has been pressed, the procedure moves to step S607. If the record stop button has not been pressed, the CPU 101 continues recording of the moving image and repeats the determination processing of step S606 until the record stop button is pressed. Note that in the case in which the snap record mode mentioned above has been activated, the procedure moves to step S607 upon the snap recording time elapsing from the start of shooting, even if the record stop button has not been pressed.

In step S607, the CPU 101 controls the image processing unit 104 to stop the encoding processing for the video signal and the processing for recording the moving image file to the recording medium 108 also stops. Thereafter, the procedure returns to step S601, and the CPU 101 prepares to record the next moving image.

Figure 6:
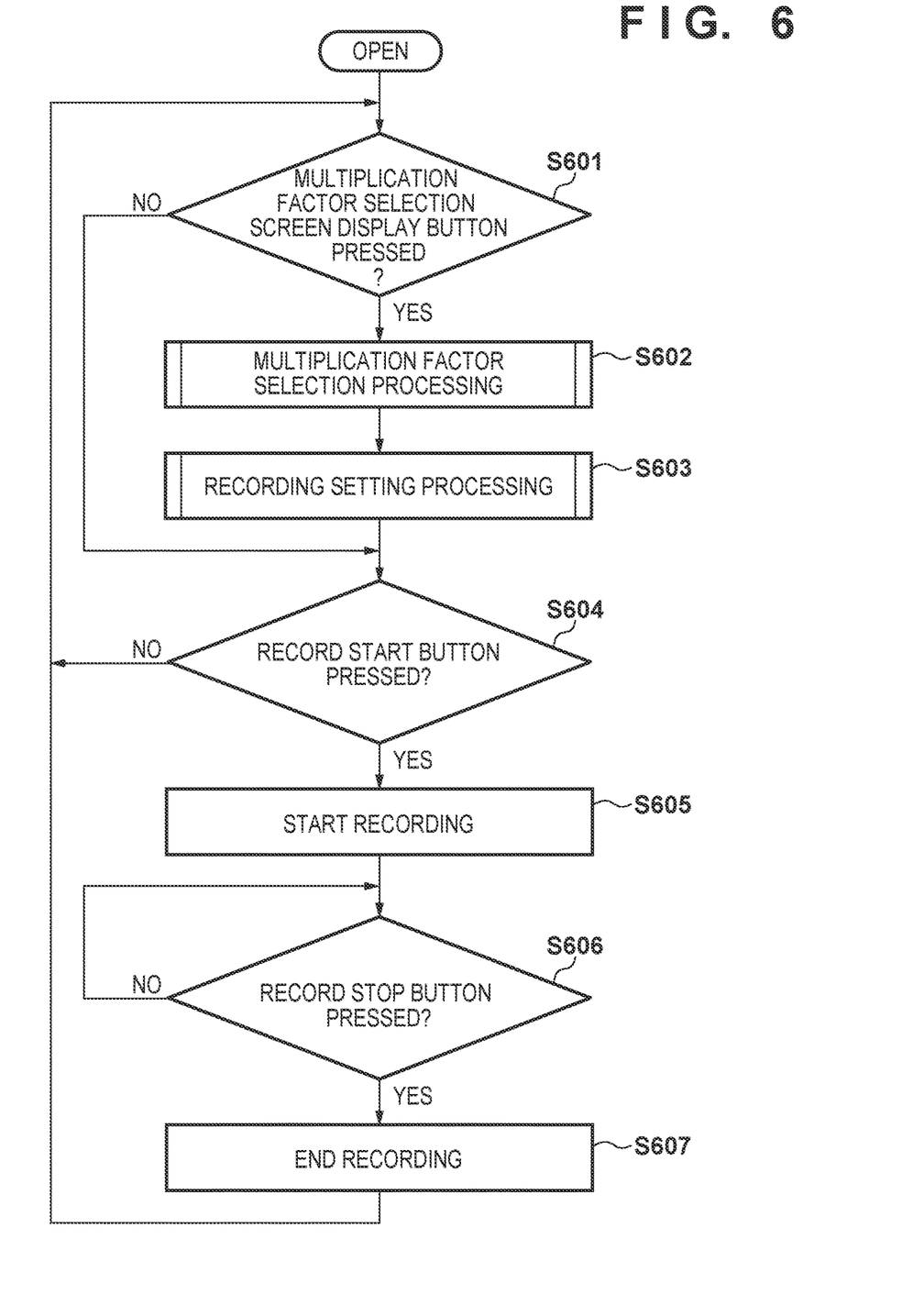
FIG. 6 is a flowchart showing operations of the image capturing apparatus 100.
Figure 7:
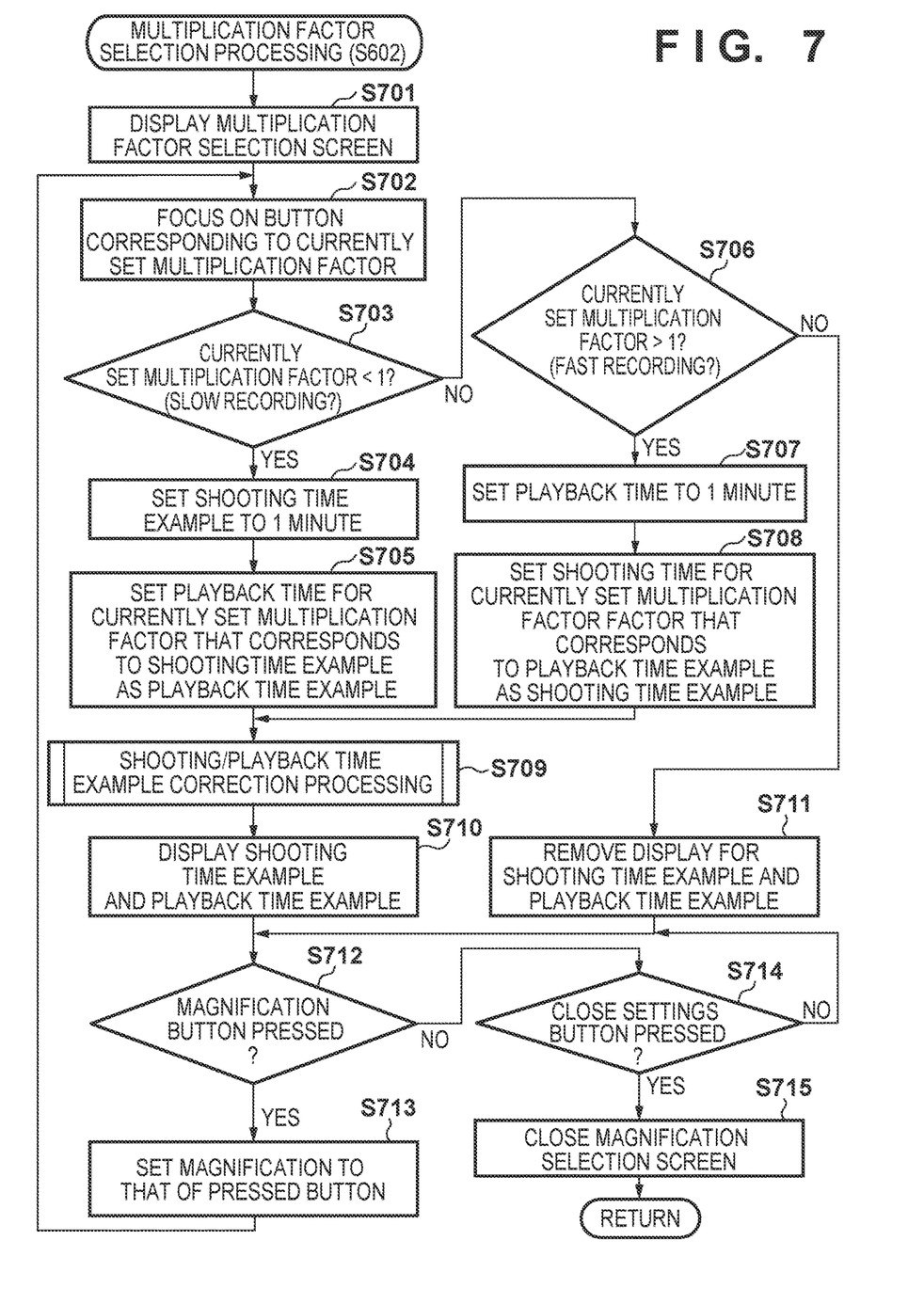
FIG. 7 is a flowchart showing the details of multiplication factor selection processing in step S602 in FIG. 6.

FIG. 7 is a flowchart showing the details of the multiplication factor selection processing in step S602 in FIG. 6. Unless otherwise stated, the processing for the steps of this flowchart is realized by the CPU 101 expanding programs recorded to the nonvolatile memory 103 in the volatile memory 102 functioning as the work memory and executing the expanded programs.

First, in step S701, the CPU 101 controls the image processing unit 104, and displays the multiplication factor selection screen on the display 105. The multiplication factor selection screen includes a plurality of multiplication factor buttons that correspond to the types of shooting speed multiplication factors that can be set in the image capturing apparatus 100. The user can select his or her desired shooting speed multiplication factor by pressing the corresponding multiplication factor button.

In step S702, the CPU 101 controls the image processing unit 104, and performs focus processing on the multiplication factor button corresponding to the currently set shooting speed multiplication factor. Specifically, the multiplication factor button that corresponds to the currently set multiplication factor is rendered with a color different from that of the other multiplication factor buttons so as to be prominently displayed. For example, if the current multiplication factor is set to be ¼, the multiplication factor buttons take on a state such as the multiplication factor buttons 301 shown in FIG. 3A.

In step S703, the CPU 101 determines whether or not the currently set shooting speed multiplication factor is less than one. A multiplication factor set to be less than one corresponds to slow recording. If the multiplication factor is set to be less than one, the procedure moves to step S704. Otherwise, the procedure moves to step S706.

In step S704, the CPU 101 sets the shooting time example to one minute. In step S705, the CPU 101 sets the playback time for the currently set multiplication factor that corresponds to the shooting time example as the playback time example. Specifically, the CPU 101 sets the time period obtained by multiplying the one minute set as the shooting time example by the reciprocal of the currently set multiplication factor as the playback time example. Thereafter, the procedure moves to step S709.

On the other hand, if the multiplication factor is set to be one or more, in step S706, the CPU 101 determines whether or not the currently set shooting speed multiplication factor IS greater than one. A multiplication factor set to be greater than one corresponds to fast recording. If the multiplication factor is set to be greater than one, the procedure moves to step S707. Otherwise, the procedure moves to step S711.

In step S707, the CPU 101 sets the playback time example to one minute. In step S708, the CPU 101 sets the shooting time for the currently set multiplication factor that corresponds to the playback time example as the shooting time example. Specifically, the CPU 101 sets the time period obtained by multiplying the one minute set as playback time example by the currently set multiplication factor as the shooting time example. Thereafter, the procedure moves to step S709.

In step S709, the CPU 101 performs correction processing on the shooting time example and the playback time example set in steps S704 and S705 or in steps S707 and S708. Details of the correction processing in step S709 are described below with reference to FIG. 8.

In step S710, the CPU 101 controls the image processing unit 104, and displays the shooting time example and the playback time example on the display 105. The display example for step S710 is described below with reference to FIGS. 3A and 3B and FIGS. 4A to 4C. Thereafter, the procedure moves to step S712.

On the other hand, in the case in which the multiplication factor is set to be one, neither slow recording or fast recording is performed (i.e., normal recording is performed). In this case, a difference between the actual shooting time and the playback time does not occur. For this reason, in step S711, the CPU 101 controls the image processing unit 104, and removes display of the shooting time example and the playback time example from the display 105. The display example for step S711 is described below with reference to FIG. 5. Alternatively, the CPU 101 may set and display the shooting time example and the playback time example as the same time period (e.g. "1 MINUTE"). Thereafter, the procedure moves to step S712.

Figure 3B:
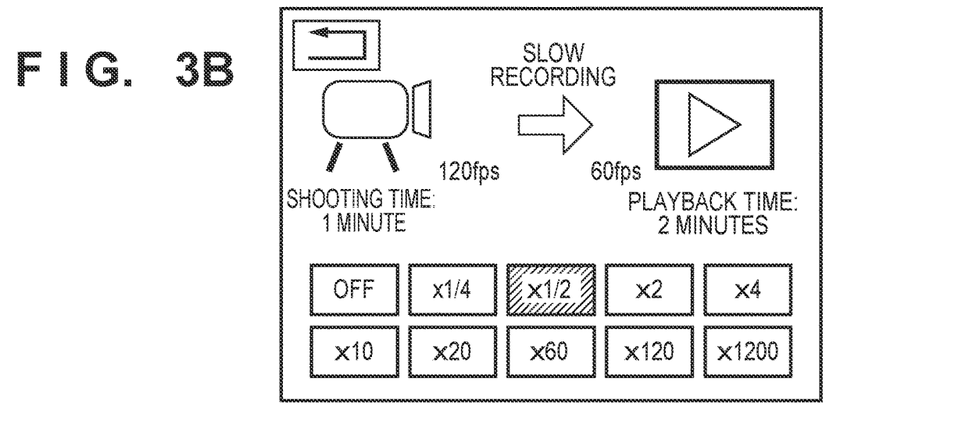

Here the display example for step S710 will be described with reference to FIGS. 3A and 3B, and FIGS. 4A to 4C. For example, in the case in which the multiplication factor is set to be ¼ and the shooting time example and the playback time example were not changed by the correction processing in step S709, "1 MINUTE" and "4 MINUTES" are respectively displayed as the shooting time example and the playback time example, as shown in FIG. 3A. Also, in the case in which the multiplication factor is set to be ½, "1 MINUTE" and "2 MINUTES" are respectively displayed as the shooting tame example and the playback time example as shown in FIG. 3B. As can be comprehended from comparing FIG. 3A and FIG. 3B, in the case of slow recording, the playback time corresponding to the fixed actual shooting time increases as the multiplication factor decreases, enabling the user to more intuitively understand that the moving image will play back slower.

Figure 4A:
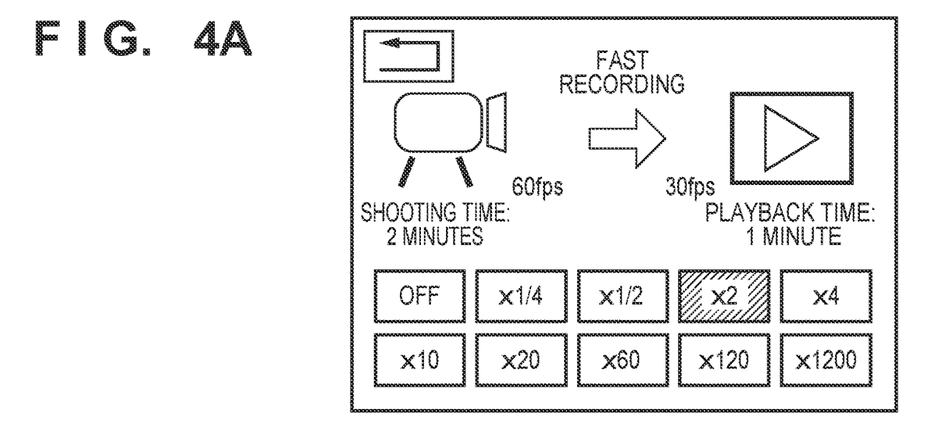
FIGS. 4A to 4C are diagrams showing an example of a multiplication factor selection screen displayed on the display 105 of the image capturing apparatus 100 (in a case of fast recording).
Figure 4B:
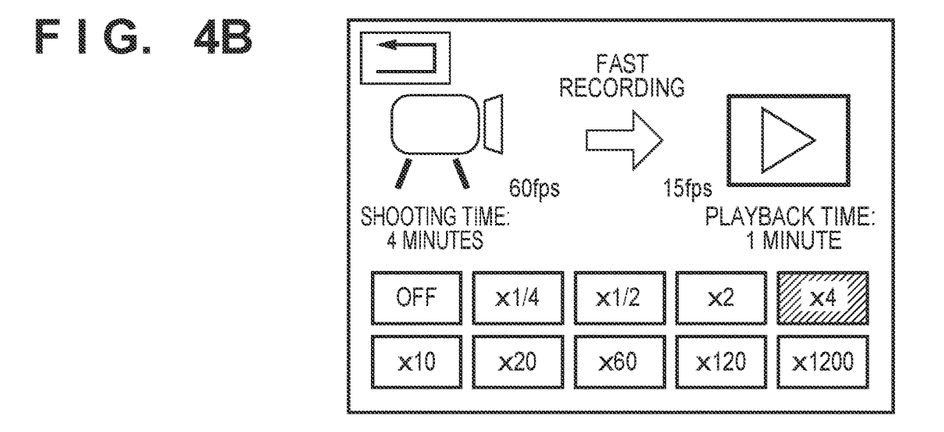
Figure 4C:
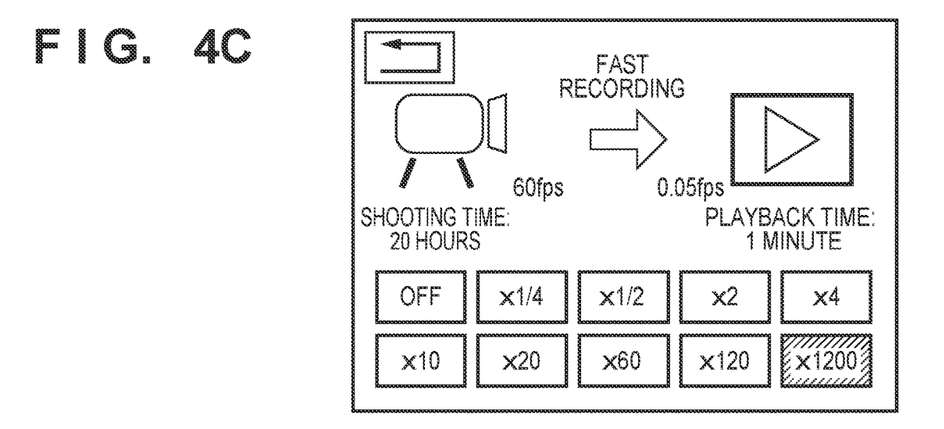

Also, in the case in which the multiplication factor is set to be two, "2 MINUTES" and "1 MINUTE" are respectively displayed as the shooting time example and the playback time example as shown in FIG. 4A. In contrast to this, in FIG. 4B, the multiplication factor is set to be four, and "4 MINUTES" and "1 MINUTE" are respectively displayed as the shooting time example and the playback time example. As can be comprehended from comparing FIG. 4A and FIG. 4B, in the case of fast recording, the actual shooting time corresponding to the fixed playback time increases as the multiplication factor increases, enabling the user to more intuitively understand that a longer time period will be required for shooting. Also, in the case of fast recording, the playback time is fixed and thus a situation where an unnaturally short playback time example is displayed can be avoided, even if the multiplication factor is set to be an extremely large value like 1200 such as shown in FIG. 4C, for example. In this case, the shooting time example is long at 20 hours, but it is generally assumed that a high set multiplication factor will be used in the case of shooting the movement of stars overnight, for example, and therefore the user will not find it all that unnatural that the shooting time example is long.

Figure 5:
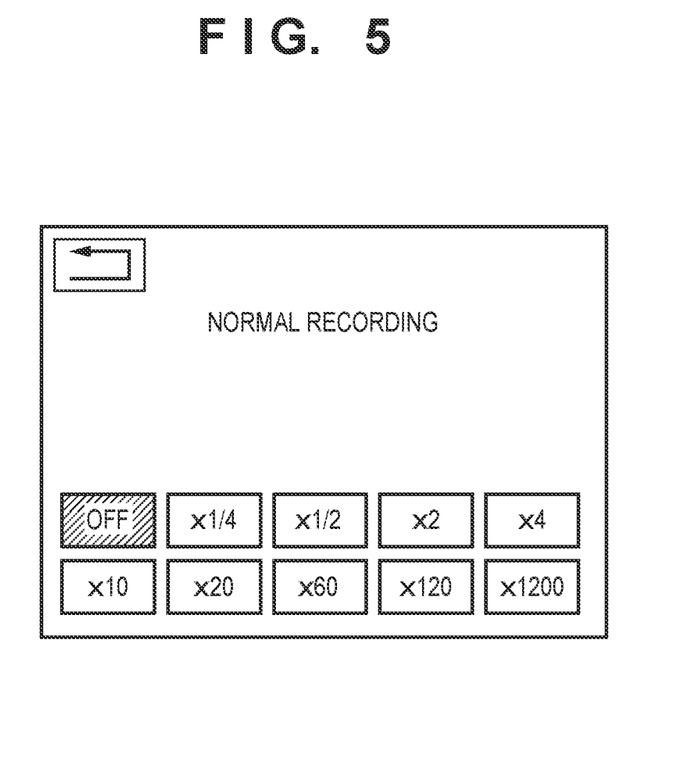
FIG. 5 is a diagram showing an example of a multiplication factor selection screen displayed on the display 105 of the image capturing apparatus 100 (in a case of normal recording).

Next, the display example for step S711 will be described with reference to FIG. 5. As can be comprehended from FIG. 5, in the case in which the multiplication factor is set to be one (the case of normal recording), the multiplication factor buttons are displayed, but the shooting time example and the playback time example are not displayed. However, as described above, the same time period may be displayed as the shooting time example and the playback time example.

Returning to FIG. 7, in step S712, the CPU 101 determines whether or not any of the plurality of multiplication factor buttons displayed on the display 105 have been pressed. If any of the multiplication factor buttons have been pressed, the procedure moves to step S713, otherwise the procedure moves to step S714.

In step S713, the CPU 101 sets the multiplication factor corresponding to the multiplication factor button determined as having been pressed in step S712 as the shooting speed multiplication factor. Thereafter, the procedure returns to step S702, and the CPU 101 updates the multiplication factor selection screen based on the set multiplication factor after the change.

If a multiplication factor button was not pressed in step S712, in S714, the CPU 101 determines whether or not the close settings button displayed on the display 105 was pressed by the user. If the close settings button was pressed, the procedure moves to step S715, otherwise the procedure returns to step S712.

In step S715, the CPU 101 controls the image processing unit 104, and performs processing for closing the multiplication factor selection screen by removing the display of all of the multiplication factor buttons, the shooting time example, and the playback time example from the display 105. Accordingly, the display screen of the display 105 returns to the normal display screen.

Figure 8:
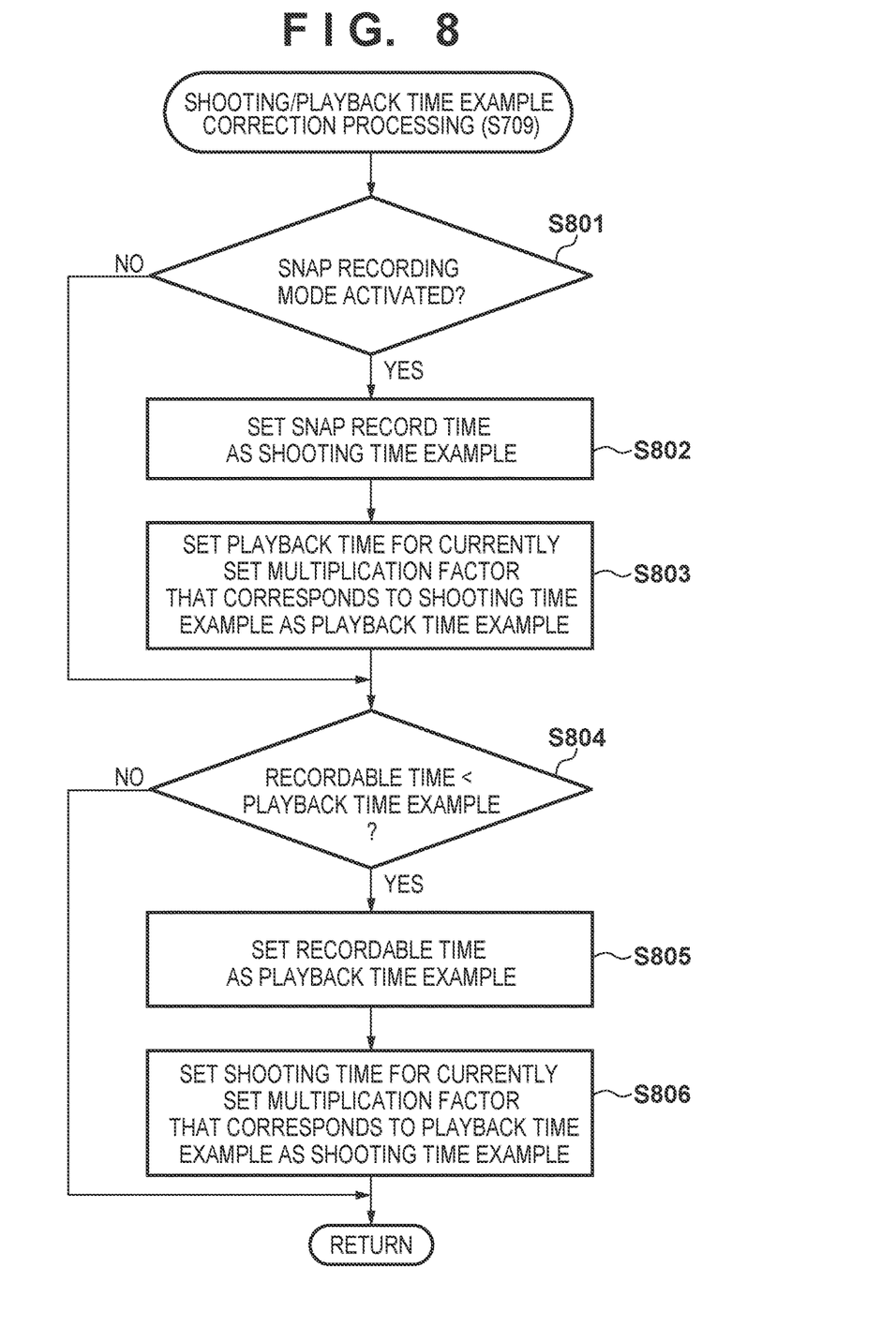
FIG. 8 is a flowchart showing the details of correction processing for a shooting time example and a playback time example in step S709 in FIG. 7.

FIG. 8 is a flowchart showing the details of correction processing for the shooting time example and the playback time example in step S709 in FIG. 7. Unless otherwise stated, the processing for the steps of this flowchart is realized by the CPU 101 expanding programs recorded to the nonvolatile memory 103 in the volatile memory 102 functioning as the work memory and executing the expanded programs.

In step S801, the CPU 101 obtains the status of the snap record mode and determines whether or not the snap record mode has been activated. If the snap record mode has been activated, the procedure moves to step S802, otherwise the procedure moves to step S804.

In step S802, the CPU 101 sets the snap recording time (e.g. four seconds) as the shooting time example. In step S803, the CPU 101 sets the playback time for the currently set multiplication factor that corresponds to the shooting time example as the playback time example. Specifically, the CPU 101 sets the time period obtained by multiplying the numerical value set as the shooting time example by the reciprocal of the currently set multiplication factor as the playback time example. In this way, in the case in which the snap record mode has been activated, the shooting time example is fixed as the snap recording time in the case of either slow recording or fast recording being performed.

In step S804, the CPU 101 obtains the recordable time based on the available capacity of the recording medium 108 etc., and determines whether or not the recordable time is shorter than the playback time example. If the recordable time is shorter than the playback time example, the procedure moves to step S805, otherwise the correction processing ends.

In step S805, the CPU 101 sets the recordable time as the playback time example. In S806, the CPU 101 sets the shooting time for the currently set multiplication factor that corresponds to the playback time example as the shooting time example. Specifically, the CPU 101 sets the time period obtained by multiplying the numerical value set as the playback time example by the currently set multiplication factor as the shooting time example. In this way, in the case in which the recordable time is shorter than the playback time example, the playback time example is fixed to the recordable time in the case of both slow recording and fast recording.

Figure 9:
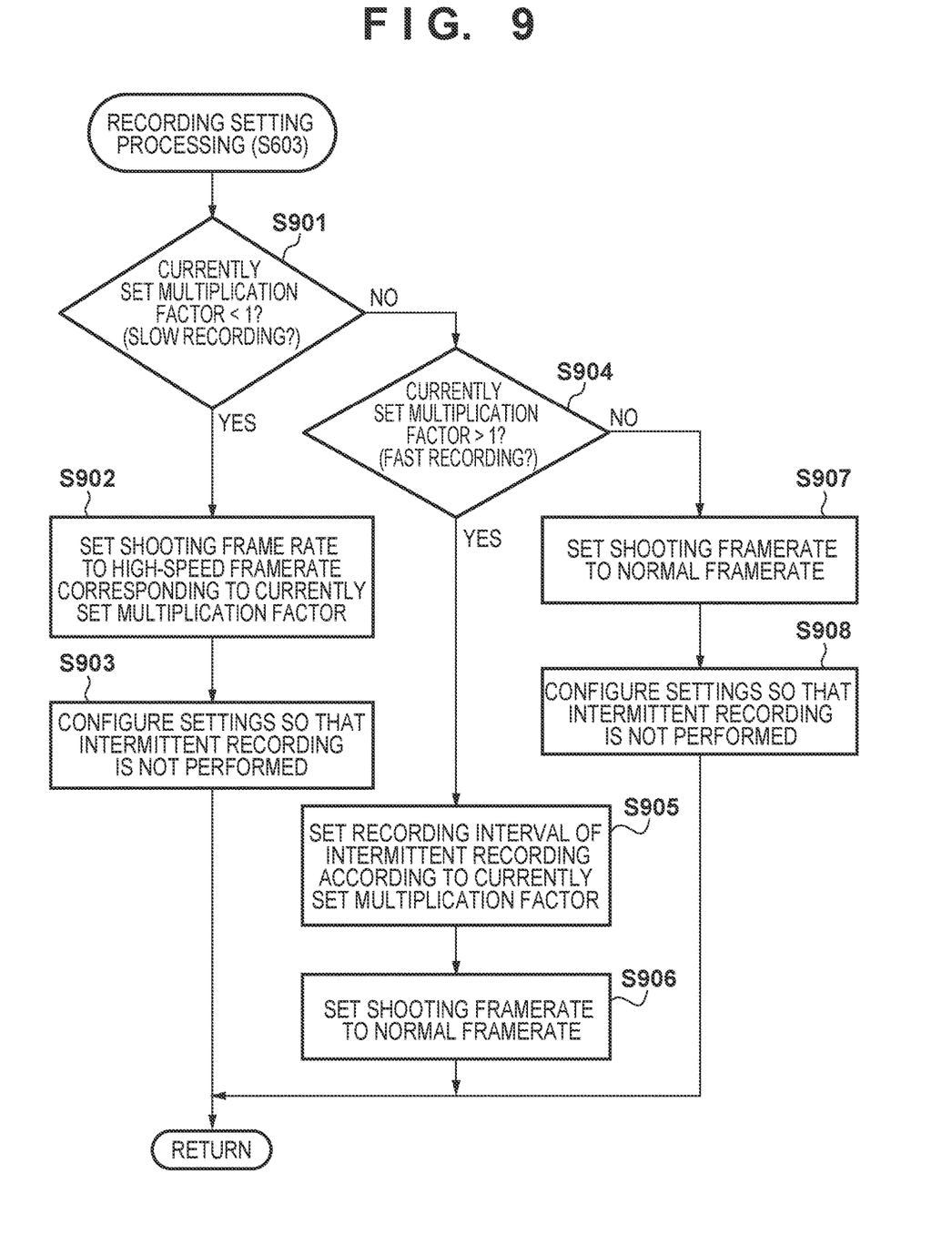
FIG. 9 is a flowchart showing the details of recording setting processing in step S603 in FIG. 6.

FIG. 9 is a flowchart showing the details of the recording setting processing in step S603 in FIG. 6. Unless otherwise stated, the processing for the steps of this flowchart is realized by the CPU 101 expanding programs recorded to the nonvolatile memory 103 in the volatile memory 102 functioning as the work memory and executing the expanded programs.

In step S901, the CPU 101 determines whether or not the currently set shooting speed multiplication factor is less than one. A multiplication factor set to be less than one corresponds to slow recording. If the multiplication factor is set to be less than one, the procedure moves to step S902. Otherwise, the procedure moves to step S904.

In step S902, the CPU 101 controls the image capturing unit 112, and configures the settings such that the image capturing unit 112 operates at a high-speed frame rate corresponding to the currently set shooting speed multiplication factor. Specifically, the CPU 101 sets the shooting frame rate such that the image capturing unit 112 operates at a frame rate obtained by multiplying the frame rate when normal shooting is performed by the reciprocal of the currently set multiplication factor. For example, in the case in which the multiplication factor is set to be ¼, the high-speed frame rate will be set to be 240 fps, if the normal shooting frame rate is 60 fps (see FIG. 3A).

In step S903, the CPU 101 controls the image processing unit 104, and configures the settings such that normal recording is performed and intermittent recording is not performed.

On the other hand, in the case in which the multiplication factor is set to be one or more, in step S904, the CPU 101 determines whether or not the currently set shooting speed multiplication factor is greater than one. A multiplication factor set to be greater than one corresponds to fast recording. If the multiplication factor is set to be greater than one, the procedure moves to step S905. Otherwise, the procedure moves to step S907.

In step S905, the CPU 101 controls the image processing unit 104, and sets the recording interval for intermittent recording according to the currently set multiplication factor. Specifically, the image processing unit 104 performs thinning processing on the number of frames input from the image capturing unit 112 such that the number of frames that undergo encoding is a number obtained by multiplying the number of input frames by the reciprocal of the set multiplication factor. For example, in the case in which the multiplication factor is set to be four, the image processing unit 104 thins out three of four frames of the video signal input from the image capturing unit 112 such that the number of frames to undergo encoding is ¼, which is the reciprocal of the set multiplication factor, and encodes and records the thinned out pixels. For example, in the case in which the multiplication factor is set to be four, the encoding rate will be 15 fps, if the normal frame rate is 60 fps (see FIG. 4B).

In step S906, the CPU 101 controls the image capturing unit 112, and configures the settings such that the shooting frame rate is the frame rate for when normal recording is performed.

On the other hand, in the case in which the multiplication factor is set to be one, in step S907, the CPU 101 controls the image capturing unit 112, and configures the settings such that the shooting frame rate is the frame rate for when normal recording is performed. In step S908, the CPU 101 controls the image processing unit 104, and configures the settings such that normal recording is performed and intermittent recording is not performed.

Note that as described above with reference to FIG. 3A, the multiplication factor selection screen may include the image capturing unit frame rate display 305 and the image processing unit frame rate display 306. The image capturing unit frame rate display 305 corresponds to the shooting frame rate set in step S902 or in step S906 of FIG. 9, and the image processing unit frame rate display 306 corresponds to the encoding rate that is based on the settings for intermittent recording configured in step S903 or in step S905 of FIG. 9. In the case in which the multiplication factor selection screen includes the image capturing unit frame rate display 305 and the image processing unit frame rate display 306, the CPU 101 calculates the shooting frame rate and the encoding frame rate that correspond to the set multiplication factor at the respective timings at which these frame rates are displayed (e.g. step S710 of FIG. 7).

As described above, according to the first embodiment, in the case in which the set multiplication factor is changed to be in the range of slow recording, the image capturing apparatus 100 fixes the shooting time example and changes the corresponding playback time example. Also, in the case in which the set multiplication factor is changed to be in the range of fast recording, the image capturing apparatus 100 fixes the playback time example and changes the corresponding shooting time example.

Accordingly, when the user sets the multiplication factor to slow recording or fast recording, the user can easily and intuitively recognize the difference between the actual shooting time and the playback time. In other words, in the case of slow recording, the playback time corresponding to the fixed actual shooting time increases as the multiplication factor decreases, and the user can more intuitively understand that the moving image will play back slower. Also, in the case of fast recording, the actual shooting time corresponding to the fixed playback time increases as the multiplication factor increases, and the user can more intuitively understand that a longer time period will be required for shooting. Also, the time example to be fixed is switched between the case of slow recording and the case of fast recording, but the shooting time example is consistently fixed in the case of slow recording, and the playback time example is consistently fixed in the case of fast recording. For this reason, the user can easily recognize the respective differences between multiplication factors for slow recording and differences between multiplication factors for fast recording.

Also, in the present embodiment, since the time example to be fixed is switched between the case of slow recording and the case of fast recording, the range of fluctuation of the shooting time example and the playback time example is suppressed, and the user can easily recognize the difference between the actual shooting time and the playback time. Supposing the case in which either the shooting time example or the playback time example is always fixed, the corresponding playback time example or the corresponding shooting time example would change by 4800× ((reciprocal of ¼)×1200) at maximum, if the multiplication factor can be set within the range of the multiplication factor buttons 301 shown in FIG. 3A. However, in the present embodiment, this change is suppressed to 1200× at maximum.

Furthermore, in the present embodiment, situations where the shooting time example and the playback time example are unnaturally long or unnaturally short are suppressed, and time examples of easily understandable length that the user does not find unnatural are displayed. Incidentally, while 20 hours, which is the shooting time example shown in FIG. 4C, is a comparatively long time period, in general it is assumed that a high set multiplication factor will be used in a case of shooting the movement of stars overnight, for example, and therefore the user will not find the long shooting time example that unnatural.

Figure 10:
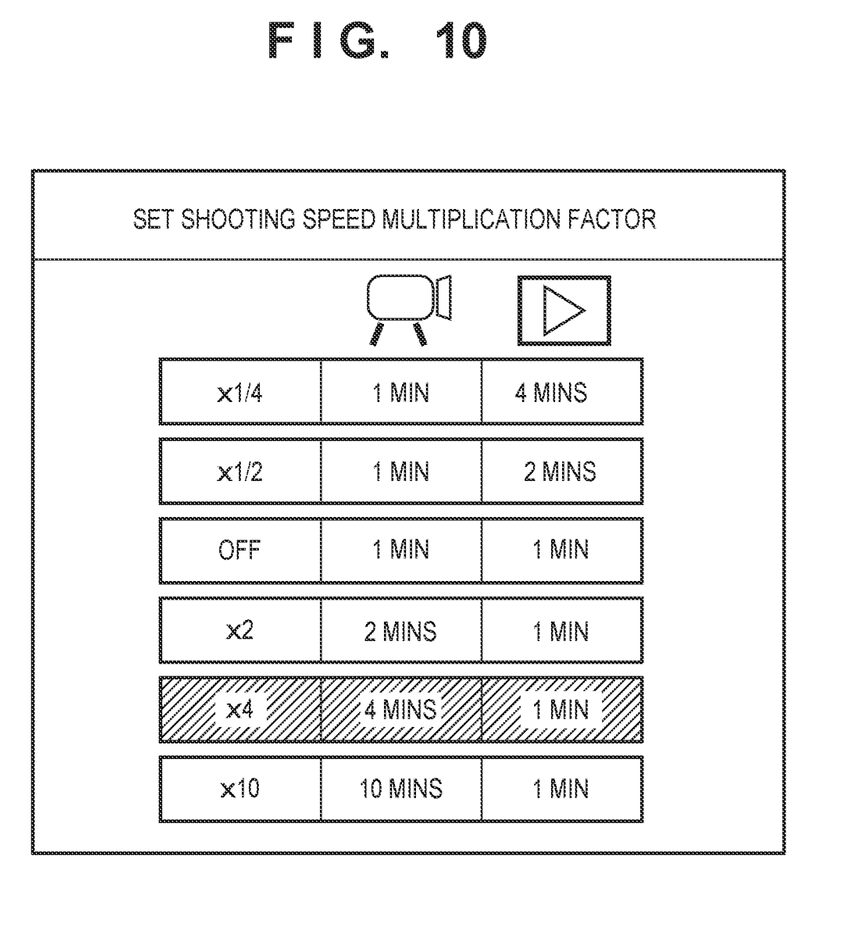
FIG. 10 is a diagram showing a variation of a multiplication factor selection screen displayed on the display 105 of the image capturing apparatus 100.

Note that in the present embodiment, the corresponding shooting time example and playback time example are displayed by the user pressing a multiplication factor button on the multiplication factor selection screen, but the display configuration of the shooting time example and the playback time example is not limited thereto. For example, as shown in FIG. 10, the image capturing apparatus 100 may generate a multiplication factor selection screen that displays a list of multiple selectable multiplication factors and simultaneously displays the shooting time example and the playback time example in advance in relation to each multiplication factor. In FIG. 10, the shooting time example and the playback time example are also displayed in the row in which the multiplication factor is one (OFF), but these time examples do not necessarily need to be displayed. Also, depending on the display screen size of the display 105, only a portion (two or more) of the multiple selectable multiplication factors will be simultaneously displayed. In this case, the user can switch between multiplication factors that are to be displayed by performing an operation using the operation unit 106, for example.

Also, in the present embodiment, if the shooting speed multiplication factor is set to be less than one, the shooting time example is fixed at one minute and displayed, and if the shooting speed multiplication factor is set to be greater than one, the playback time example is fixed at one minute and displayed. In this way, in the case of fixing the shooting time example and in the case of fixing the playback time example, the display is more easily understood by the user by fixing the two example times to be the same time period (one minute here). Particularly, by fixing the shooting time example and the playback time example to the time unit of one minute, the user can intuitively understand what time period will apply to the corresponding playback time example or the corresponding shooting time example. Note that the present embodiment is not limited to this, and the fixed time periods for the shooting time example and the playback time example may be different time periods. Also, the image capturing apparatus 100 may be configured such that the user can freely change the fixed time periods. In this case, the image capturing apparatus 100 may display the latest fixed time period to be changed by the user out of the shooting time example and the playback time example, regardless of the set shooting speed multiplication factor, and change the other time example according to the set multiplication factor. In this way, the user can know the corresponding playback time if they themselves changed the shooting time example, and the user can know the corresponding shooting time if they themselves changed the playback time example, regardless of the set shooting speed multiplication factor.

Note that control by the CPU 101 may be performed by one piece of hardware, or control of the entire apparatus may be performed by sharing the processing between multiple pieces of hardware.

Also, the present invention has been described based on preferred embodiments, but the present invention is not limited to these specific embodiments, and various configurations that do not depart from the spirit of the present invention are also included therein. Furthermore, each embodiment described above is merely one embodiment of the present invention, and the embodiments can be appropriately combined.

Also, the embodiments mentioned above were described taking the case where the present invention was applied to the image capturing apparatus 100 as an example, but the present invention is not limited to this example, and is applicable to any image capturing control apparatus that controls image capturing. Also, the apparatus that actually performs image capturing may be an external image capturing apparatus. In this case, for example, the image capturing control apparatus (e.g., a smartphone or a tablet PC) and the image capturing apparatus are connected wirelessly or by a cable, and live view images captured by the image capturing apparatus are displayed on the display of the image capturing control apparatus. The image capturing apparatus is then instructed to start image capturing (recording) in response to an operation from the image capturing control apparatus. In particular, fast recording, which is so-called time-lapse shooting, and the method of use that is generally known involves controlling a digital camera that is fixed outdoors with a tripod or the like from indoors with a smartphone or the like to shoot the movement of astronomical bodies or the transition of clouds. Accordingly, the present invention can be applied to a smartphone or a tablet PC, a personal computer or a PDA, a mobile phone terminal or a portable image viewer, a printer apparatus including a display, a digital photo frame, a music player, a game console, an electronic book reader, and the like.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-254551, filed Dec. 16, 2014 which is hereby incorporated by reference herein in its entirety.

What is claimed is:

1. An image capturing control apparatus, comprising:
   at least one processor, and
   a memory storing instructions which cause the at least one processor to perform operations of:
   selecting, as a setting relating to shooting of a moving image by an image capturing unit, any of a plurality of settings having respectively different ratios of a length of a shooting time to a length of a playback time; and
   performing control such that:
      when a first or second setting, in which a length of a shooting time is shorter than a length of a playback time, is selected from the plurality of settings, a length of a predetermined exemplary shooting time is displayed as a length of a shooting time, wherein in the case of the first setting, a length of a first playback time that corresponds to the length of the predetermined exemplary shooting time in accordance with the first setting is displayed together with the length of the predetermined exemplary shooting time, and in the case of the second setting, a length of a second playback time that corresponds to the length of the predetermined exemplary shooting time in accordance with the second setting is displayed together with the length of the predetermined exemplary shooting time; and
      when a third or fourth setting, in which a length of a shooting time is longer than a length of a playback time, is selected from the plurality of settings, a length of a predetermined exemplary playback time is displayed as a length of a playback time, wherein in the case of the third setting, a length of a third shooting time that corresponds to the length of the predetermined exemplary playback time in accordance with the third setting is displayed together with the length of the predetermined exemplary playback time, and in the case of the fourth setting, a length of a fourth shooting time that corresponds to the length of the predetermined exemplary playback time in accordance with the fourth setting is displayed together with the length of the predetermined exemplary playback time.

2. The image capturing control apparatus according to claim 1, wherein the memory further stores instructions which cause the at least one processor to perform operations of:
   determining whether or not a length of a recordable time for the moving image is shorter than the length of the playback time corresponding to the length of the predetermined shooting time,
   wherein in performing control, in the case in which the length of the recordable time is shorter than the length of the playback time corresponding to the length of the predetermined exemplary shooting time, the length of the recordable time is displayed as the length of the playback time instead of the length of the playback time corresponding to the length of the predetermined exemplary shooting time, and a length of a shooting time that corresponds to the length of the recordable time and is different for each setting is displayed.

3. The image capturing control apparatus according to claim 1, wherein the memory further stores instructions which cause the at least one processor to perform operations of:
setting activation/deactivation of a predetermined operation mode that automatically stops shooting upon a predetermined time period elapsing after shooting of the moving image has started,
in performing control, in the case in which the predetermined operation mode is activated, the predetermined time period is displayed as the length of the shooting time, and a length of a playback time that corresponds to the predetermined time period and is different for each setting is displayed.

4. The image capturing control apparatus according to claim 1, wherein the length of the predetermined exemplary shooting time and the length of the predetermined exemplary playback time are the same length.

5. The image capturing control apparatus according to claim 1, wherein the memory further stores instructions which cause the at least one processor to perform operations of:
changing the length of the predetermined exemplary shooting time or the length of the predetermined exemplary playback time in accordance with an instruction from a user.

6. The image capturing control apparatus according to claim 5,
wherein in performing control, in the case in which the length of the predetermined exemplary shooting time has been changed by the change unit, the length of the predetermined exemplary shooting time and a length of a playback time that corresponds to the length of the predetermined exemplary shooting time and is different for each setting are displayed for any setting in which a length of a shooting time is shorter than a length of a playback time and any setting in which a length of a shooting time is longer than a length of a playback time, out of the plurality of settings, and
in performing control, in the case in which the length of the predetermined exemplary playback time has been changed by the change unit, the length of the predetermined exemplary playback time and a length of a shooting time that corresponds to the length of the predetermined exemplary playback time and is different for each setting are displayed for any setting in which a length of a shooting time is shorter than a length of a playback time and any setting in which a length of a shooting time is longer than a length of a playback time, out of the plurality of settings.

7. The image capturing control apparatus according to claim 1, wherein in performing control, a length of a shooting time and a length of a playback time are not displayed prior to shooting for a setting in which a length of a shooting time and a length of a playback time are equal, out of the plurality of settings.

8. The image capturing control apparatus according to claim 1, wherein in performing control, in response to any of the plurality of settings being selected by the selection unit, a length of a shooting time and a length of a playback time that correspond to the selected setting are displayed.

9. The image capturing control apparatus according to claim 1, wherein in performing control, corresponding lengths of shooting times and lengths of playback times are displayed simultaneously for each of two or more settings out of the plurality of settings.

10. The image capturing control apparatus according to claim 9, wherein the two or more settings include a setting in which a length of a shooting time is shorter than a length of a playback time and a setting in which a length of a shooting time is longer than a length of a playback time.

11. The image capturing control apparatus according to claim 1, wherein in performing control, a length of a shooting time and a length of a corresponding playback time are displayed prior to shooting by the image capturing unit starting.

12. The image capturing control apparatus according to claim 1,
wherein in performing control:
the length of the predetermined exemplary shooting time and a length of a playback time that corresponds to the length of the predetermined exemplary shooting time and is different for each setting are respectively displayed as a length of a shooting time example and a length of a playback time example, and
the length of the predetermined exemplary playback time and a length of a shooting time that corresponds to the length of the predetermined exemplary playback time and is different for each setting are respectively displayed as a length of a playback time example and a length of a shooting time example.

13. A method of controlling an image capturing control apparatus, comprising:
selecting, as a setting relating to shooting of a moving image by an image capturing unit, any of a plurality of settings having respectively different ratios of a length of a shooting time to a length of a playback time; and
performing control such that:
in a case where a first or second setting, in which a length of a shooting time is shorter than a length of a playback time, is selected from the plurality of settings, a length of a predetermined exemplary shooting time is displayed as a length of a shooting time, wherein in a case of the first setting, a length of a first playback time that corresponds to the length of the predetermined exemplary shooting time in accordance with the first setting is displayed together with the length of the predetermined exemplary shooting time, and in a case of the second setting, a length of a second playback time that corresponds to the length of the predetermined exemplary shooting time in accordance with the second setting is displayed together with the length of the predetermined exemplary shooting time; and
in a case where a third or fourth setting, in which a length of a shooting time is longer than a length of a playback time, is selected from the plurality of settings, a length of a predetermined exemplary playback time is displayed as a length of a playback time, wherein in a case of the third setting, a length of a third shooting time that corresponds to the length of the predetermined exemplary playback time in accordance with the third setting is displayed together with the length of the predetermined exemplary playback time, and in a case of the fourth setting, a length of a fourth shooting time that corresponds to the length of the predetermined exemplary playback time in accordance with the fourth setting is displayed together with the length of the predetermined exemplary playback time.

14. A non-transitory computer-readable storage medium which stores a program for causing a computer to execute a method of controlling an image capturing control apparatus, the method comprising:
- selecting, as a setting relating to shooting of a moving image by an image capturing unit, any of a plurality of settings having respectively different ratios of a length of a shooting time to a length of a playback time; and
- performing control such that:
  - in a case where a first or second setting, in which a length of a shooting time is shorter than a length of a playback time, is selected from the plurality of settings, a length of a predetermined exemplary shooting time is displayed as a length of a shooting time, wherein in a case of the first setting, a length of a first playback time that corresponds to the length of the predetermined exemplary shooting time in accordance with the first setting is displayed together with the length of the predetermined exemplary shooting time, and in a case of the second setting, a length of a second playback time that corresponds to the length of the predetermined exemplary shooting time in accordance with the second setting is displayed together with the length of the predetermined exemplary shooting time; and
  - in a case where a third or fourth setting, in which a length of a shooting time is longer than a length of a playback time, is selected from the plurality of settings, a length of a predetermined exemplary playback time is displayed as a length of a playback time, wherein in a case of the third setting, a length of a third shooting time that corresponds to the length of the predetermined exemplary playback time in accordance with the third setting is displayed together with the length of the predetermined exemplary playback time, and in a case of the fourth setting, a length of a fourth shooting time that corresponds to the length of the predetermined exemplary playback time in accordance with the fourth setting is displayed together with the length of the predetermined exemplary playback time.

15. The image capturing control apparatus according to claim 8, wherein in performing control, the length of the predetermined shooting time to be displayed is same for respective settings in which a length of a shooting time is shorter than a length of a playback time, out of the plurality of settings.

16. The image capturing control apparatus according to claim 8, wherein in performing control, the length of the predetermined playback time to be displayed is same for respective settings in which a length of a shooting time is longer than a length of a playback time, out of the plurality of settings.

17. The image capturing control apparatus according to claim 1, wherein the plurality of settings include shooting speed multiplication factors.

* * * * *